United States Patent [19]

Kopperschmidt et al.

[11] 3,798,558

[45] Mar. 19, 1974

[54] TIMING CURRENT SUPPLY FOR A SYSTEM OF TWO CHANNEL CIRCUITS

[75] Inventors: Gerd Kopperschmidt, Weddel; Heinz-Jurgen Lohmann, Branschweig, both of Germany

[73] Assignee: Siemens Aktiengesellschaft, Berlin & Munich, Germany

[22] Filed: July 13, 1972

[21] Appl. No.: 271,507

[30] Foreign Application Priority Data

July 16, 1971 Germany .......... 2135683

[52] U.S. Cl. .......... 328/163, 307/232, 307/262, 307/269, 307/295, 328/155

[51] Int. Cl. .......... H03b 1/00, H03k 5/00, H04b 1/10

[58] Field of Search .......... 307/232, 233, 262, 269, 307/295; 328/133, 155, 162, 163, 164

[56] References Cited

UNITED STATES PATENTS

| | | | |
|---|---|---|---|
| 3,310,751 | 3/1967 | Atzenbeck | 328/162 X |
| 3,420,950 | 1/1969 | Britt | 328/162 X |
| 3,526,713 | 9/1970 | Elvis et al. | 328/162 X |

*Primary Examiner*—Stanley D. Miller, Jr.
*Attorney, Agent, or Firm*—Hill, Sherman, Meroni, Gross & Simpson

[57] ABSTRACT

A timing current supply for a system of two channel circuits using binary switching variables in the form of two rectangular signal voltages of equal frequency in amplitude and 180° phase difference for the two values. Control devices for the anti-phase control on both channels help to switch off data, independently of data flow, during a condition of anti-valence interference. The system operates in the manner of a dynamic self holding circuit during an anti-phase condition.

4 Claims, 1 Drawing Figure

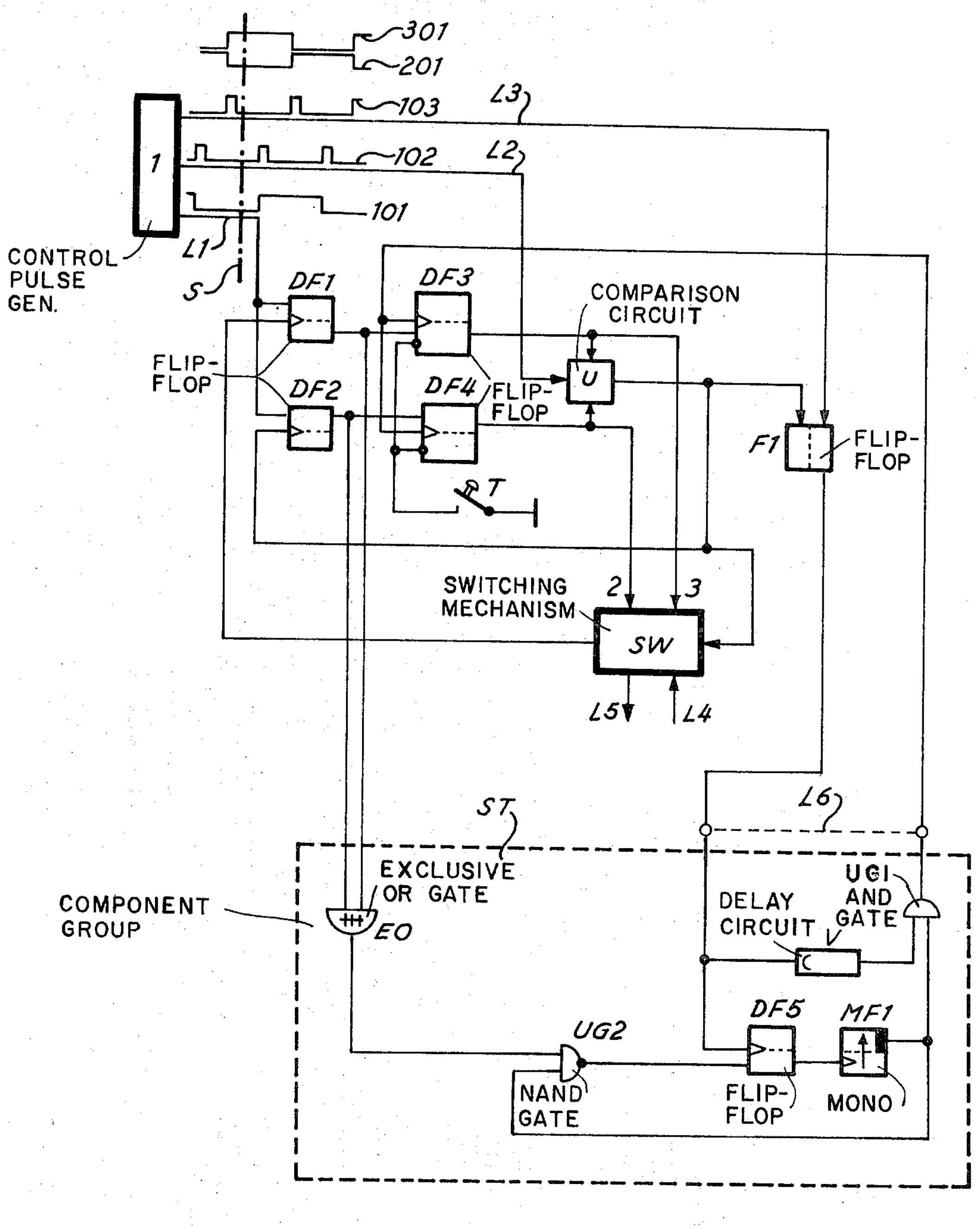
301
201
103
L3
102
L2
1
101
CONTROL PULSE GEN.
L1
S
DF1
DF3
COMPARISON CIRCUIT
FLIP-FLOP
DF2
DF4
FLIP-FLOP
U
F1
FLIP-FLOP
T
SWITCHING MECHANISM
2
3
SW
L5
L4
ST
L6
EXCLUSIVE OR GATE
COMPONENT GROUP
EO
DELAY CIRCUIT
V
UG1 AND GATE
DF5
MF1
UG2
NAND GATE
FLIP-FLOP
MONO

TIMING CURRENT SUPPLY FOR A SYSTEM OF TWO CHANNEL CIRCUITS

BACKGROUND OF THE INVENTION

1. Field of the Invention

This invention relates to a timing current supply for a system of two channel circuits which utilizes binary switching variables in the form of two rectangular signal voltages. The signal voltages are of equal given repetition frequency in amplitude, and have a phase difference of 180° in order to differentiate between the two binary values. Control pulses positioned outside of the edge range of the signal voltages have at least twice the frequency of the given repetition frequency and control members further process the control pulses only in the case of existing anti-phase condition of the signal voltages.

2. Description of the Prior Art

A system of two channel circuits is disclosed in the German Auslegeschrift 1,537,379. The system has the task of carrying out logical linkages to obtain a great degree of fault safety without the application of so-called fail-safe techniques. With such a technique, each individual switching element does not have to be designed according to fail-safe principles. In this case, however, the output signals of the entire switching mechanism or the output signals of each individual switching element, respectively, must be controlled with respect to freedom from faults. This is done with the help of a control circuit associated with each two channel switching circuit, which control circuit further processes a received control pulse only when anti-phase signal voltages exist. As soon as a fault occurs with a switching circuit, it is recognized independently from the information flow and further processed. This again causes blockage of further information processing. All switching mechanism outputs then carry a binary "0" signal. This signal is associated with the danger free state in railroad safety techniques or, for example, in reactor controls. In this manner, interferences can never cause dangerous operational states, but merely cause operational delays.

The system according to the aforementioned German Auslegeschrift is a dynamic system, whereby each two channel switching circuit consists of two equal linkage members. The character of the two linkage members is determined within each two channel switching circuit by means of impressed signals which coincide with the switching variables in the form of two rectangular voltages of equal given repetition frequency in amplitude, but with the phase difference of 180°. Each one of the two linkage members in a two channel switching circuit is therefore firmly associated with one of the two impressed signals. By this NAND member, one NAND member and one NOR member are respectively produced, whereby, due to the periodic switching of the signal potential, a continuous change is made between the NAND function and the NOR function. By means of such switching between positive and negative logic, as well as testing the signals for an anti-phase condition after each switching process, a message delay time of possible interferences, which is independent from the information flow, will be obtained, and it will render itself noticeable during an immediate anti-phase interference. The message delay time is thereby limited to a period duration of the applied rectangular signals and can possibly be rendered as small as desired while taking into account the limit of the switching speeds of the applied linkage members.

SUMMARY OF THE INVENTION

The primary object of the present invention is to provide a timing current supply for the above described system which is immediately switched off when an anti-phase interference occurs in the current supply itself or in one of the two channel switching circuits which are fed by the current supply. Therefore, only static signals will be triggered in the place of the rectangular voltage of equal repetition frequency and amplitude, which are provided during a normal operation and which are shifted by 180° in phase. These signals cannot actuate the devices provided with the system, for example, as output devices for orders. They therefore remain in a position whereby no dangerous order is given.

The invention thereby proceeds from the recognition that a timing current supply can comprise a control pulse generator which controls at least one timing generator. Since usually a very efficient timing current supply is required for fairly large devices, this invention is based on a further object, in particular that the timing generators connected on the load side of the control pulse generator can be easily synchronized without the necessity of additional devices. Through a synchronous operation of several timing generators it is then guaranteed that the data exchange between several switching mechanisms is ensured without additional converter expense.

A timing pulse supply of the initially mentioned kind, while taking into account the given task, is obtained according to the present invention by the joint application of the following features. A control pulse generator provides a symmetric rectangular voltage of the given repetition frequency as a phase control pulse. The control pulse generator furthermore provides control pulses which are positioned at the leading and trailing edges of the phase control pulses so that each phase control pulse is positioned respectively between two control pulses. Two first D flip-flops have operational inputs which receive the phase control pulse and a second D flip-flop is connected to the output side of one of the first two D flip-flops and supplies the in-phase and anti-phase signal voltages at its output side. A control circuit associated with the first two D flip-flops and is connected at its output side with the triggering input of one of the two D flip-flops. A further control circuit is associated with a switching mechanism whose output signals are conjunctively linked and extended toward the triggering input of another first D flip-flop. A flip-flop which can be switched by the output signals of the control circuit or by those of the control circuits of the switching mechanism, on the one hand, as well as, on the other hand, by the edge control pulse, has its output connected at least indirectly with the triggering inputs of the two D flip-flops.

Such a timing current supply has the advantage that it is not necessarily realized with magnetic components, but can be provided to the greatest degree with TTL switching elements which are commonly available on the market. This timing current supply operates free of fault and requires a small amount of power, as well as a small amount of space. A further particular advantage is provided in that a comprehensive blocking of all switching mechanism outputs is effected by means of utilizing the given timing current supply when only one single anti-phase interference occurs at any desired place of the two channel system. Therefore, expensive selective fault recordation, information and suppression is avoided. Compared with the conventional fail-safe switching mechanisms, the fail-safe property of the above described devices has been transferred from the linkage members via the control devices to the timing current supply. Since the expense of the linkage members is essentially higher in relationship to the timing current supply in extensive switching mechanisms, this invention provides a desired saving in cost.

Since the timing current supply in the usual operational state forms a kind of self-holding circuit, a starting process must be triggered in order to initiate the operation, which would also be required after an anti-phase interference has been eliminated. This starting process can be effected manually by means of operating a particular key.

It is desired with short time anti-phase interferences not to interrupt the timing current supply immediately, but to first of all provide a stop position from where the timing current supply can reach the operational condition again or can also reach the blocking state.

According to an advantageous further development of the invention, an additional device is characterized in that the output signals of the flip-flop, on the one hand, are delayed and applied to an AND circuit, which is connected at its output side with the triggering inputs of the second D flip-flop and, on the other hand, to the triggering input of a fifth D flip-flop. An EXCLUSIVE-OR circuit is provided for controlling the anti-phase relationship of the rectangular signal voltages and feeding a NAND circuit which is connected on its output side with the conditional input of the fifth D flip-flop to control a monostable flip-flop whose basic position output is connected with the AND circuit and the NAND circuit, and whose minimum reset time is shorter than the period duration and longer than half the period duration of the given repetition frequency.

The advantage of this device is provided in the fact that short time anti-phase interferences do not cause the entire switching mechanism to block, and therefore emit the "0" information. However, it is guaranteed that the switching mechanisms are safely blocked during fairly long interferences.

BRIEF DESCRIPTION OF THE DRAWING

Other objects, features and advantages of the invention, its organization, construction and operation will be best understood from the following detail description of a preferred embodiment of the invention taken in conjunction with the accompanying single drawing on which is illustrated a schematic logic representation of a timing current supply according to the principles of the present invention.

DESCRIPTION OF THE PREFERRED EMBODIMENT

Referring to the drawing, a timing current supply comprises a control pulse generator 1 which transmits different pulses on different output lines L1, L2 and L3. The control pulse generator 1 is not switched off when anti-valency interferences are detected, but its pulses are emitted as long as the current supply of the control pulse generator does not fail or has not failed. On the other hand, devices are connected to the load side of the control pulse generator 1 and may be, together, called a timing generator. These devices, as it has been indicated in the initial portion of this specification, form a type of self-holding circuit which permits the output of the two signal voltages only during an orderly operation of the switching mechanism SW with switching variables in the form of rectangular signal voltages of equal given repetition frequency and amplitude, but with a phase difference of 180° in order to differentiate between the two logical values.

The control pulse generator 1 which need not be constructed according to a special safety principle, emits the following signals by way of the connected lines L1–L3. The line L1 will have thereon a phase control pulse 101 in the form of a symmetric rectangular voltage of a given repetition frequency. A series of control pulses 102 is emitted on the line L2. The individual pulses 102 respectively start at the edges of the phase control pulse, therefore at the positive and negative edges. Finally, the control pulse generator will emit an edge control pulse 103 on the line L3 and each pulse thereof is respectively positioned between two of the control pulses 102. It is essential that the pulses of the edge control pulse 102 and those of the control pulse 103 are so far removed from each other with respect to time that no overlapping of the edges of these pulses is provided. This condition is also provided to guarantee that the pulses 102 are delayed due to transit time occurrences, with respect to the pulses 103. In each case, an edge overlap is to be avoided since natural anti-phase interferences occur due to operational switching of the linkage members, but these interferences are no longer provided after the respective switching process. An examination, with respect to the existing anti-phase condition, by the individual pulses 102 may not be effected within the edges, with respect to time.

In order to be able to show the timely association of the rectangular signal voltages 201 and 301, which are provided as the switching variables, with the output signals of the control pulse generator 1, the two rectangular signal voltages 201 and 301 are also illustrated above the phase control pulse 101, the control pulse 102 and the edge control pulse 103, and these two rectangular signal voltages 201 and 301 supply the switching mechanism SW by way of the lines 2 and 3. The vertical broken line S is provided to determine an instant of observation. At this moment, the signal voltage 201 has a low potential and the signal voltage 301 has a high potential. Usually the logical "0" is associated with the low potential and a logical "1" is associated with the high potential. Both signal voltages are of opposite polarity with respect to each other. It is explained in the following which component groups and circuit measures will provide these opposite polarity signal voltages and control such voltages.

On the one hand, two first D flip-flops DF1 and DF2 are provided whose conditional inputs are obtained from the phase control pulse 101. Each one of the two first D flip-flops has its conditional input connected to a further D flip-flop DF3 or DF4, respectively. The lines 3 and 2, which are connected to the two D flip-flops DF3 and DF4 have, as was briefly mentioned above, the two signal voltages thereon. These voltages serve for controlling the switching mechanism SW, which has been illustrated as a large component group, in order to simplify this discussion. The lines L4 and L5 indicate that information which is to be processed are supplied via these lines, or information and orders etc, are emitted, respectively.

With the present sample embodiment, the outputs of the first two D flip-flops DF1 and DF2 are connected in such a way that anti-phase signals are already provided on the output lines during a normal operation. However, it is also possible to connect the two D flip-flops DF3 and DF4 with the first two D flip-flops DF1 and DF2 in such a way that equivalent signals are provided on the connection lines during an orderly operation. However, it is then required to connect the output line of the D flip-flop DF3 or the output line of the D flip-flop DF4 to the respective other output of the respective D flip-flop DF1, DF2. In this case, the output signals of the two second D flip-flops are again of anti-phase character. The two signal voltages 201 and 301 of the D flip-flops DF4 and DF3 are determined by a controlling circuit U, with respect to anti-phase. The circuit U conpares the two outputs of the flip-flops DF3 and DF4 and is operable to process only the control pulse 102 if anti-phase signal voltages are present at both of its inputs. On its output side, the circuit U is connected with an input of a flip-flop F1 and the triggering input of the D flip-flop DF2. Furthermore, the control pulse 102 which is further processed by the circuit U, during existing anti-valency, is extended to the switching mechanism SW. In the latter, it proceeds through all control members which are provided (not illustrated), whereby the respective output signals are conjunctively linked and to finally exit the switching mechanism SW and reach the triggering input of the D flip-flop DF1. The other input of the flip-flop F1 receives the edge control pulse 103. The output of the flip-flop F1 which is associated with the input which receives the edge control pulse 103 is connected to the triggering inputs of the second D flip-flops DF3 and DF4, by way of the connection L6 which is illustrated as a broken line. It is assumed in this case that the timing current supply is to be switched off immediately during an anti-phase interference.

The component group ST framed in a heavy broken line serves for screening out interferences during short time anti-phase interferences and causes the timing current supply to switch off only during long time anti-phase interferences, as will be explained below.

The description of the mode of operation proceeds from the instant indicated by the broken line S. It had been determined before that the signal voltages which are supplied to the control circuit U and the switching mechanism SW are of anti-phase character at this instant. The next pulse 102 which is emitted by the control pulse generator 1 on the line L2, will reach the input of the control circuit U. Since, as has been determined before, the desired anti-phase of the signal voltages still exists, the control circuit U will process the received pulse further toward the flip-flop F1, as a fault-free message, toward the triggering input of the D flip-flop DF2, and toward the control members of the switching mechanism SW. It should be added here that the two channel linkage circuits, which are provided in the switching mechanism SW, comprise an associated control member, respectively, to determine anti-valency an anti-phase condition. The pulse supplied to the control circuits in the switching mechanism SW will appear at the triggering input of the D flip-flop DF1 after a transit time due to the length of the control channel formed by the mentioned control members, and it has also the significance of a fault free message. When the pulse representing the fault free message arrives at the triggering inputs of the first D flip-flops DF1 and DF2, a high potential of the phase control pulse 101 will be provided at their operational inputs, corresponding to a logical "1." Before the latter is transferred to the triggering inputs of the two D flip-flops DF1 and DF2, the applied output of the D flip-flop DF1 will carry the logical "1" and the switched output of the D flip-flop DF2 will carry a logical "0." With the pulse control transfer of the logical "1" by the two D flip-flops DF1 and DF2, the logical states at their switched outputs will change. Then, the logical "0" will be provided at the operational input of the D flip-flop DF3, and a logical "1" at the operational input of the D flip-flop DF4. The two input signals are therefore still of anti-phase or opposite polarity character.

The control pulse 102, which is emitted by the control circuit U, will furthermore switch the flip-flop F1 so that its switched output carries a logical "0." The timely successive edge control pulse 103 will reset the flip-flop F1. The pulse which is thereby emitted at the output of the flip-flop F1 will directly reach the triggering inputs of the second D flip-flops DF3 and DF4, when first of all the line L6 is present and the component group ST is not closed. Therefore, the signals provided at its operational inputs, namely the "0" signal at the D flip-flop DF3 and the "1" signal at the D flip-flop DF4 are transferred to these flip-flops. Therefore, the phase of the switching variables are exchanged at the outputs of these two D flip-flops and on the lines 3 and 2, so that the low potential of the signal voltage 301 will be given on the line 3 and the high potential of the signal voltage 201 will be given on the line 2. Now, the processes as described above, will repeat with a successive control pulse 102 in order to examine the anti-phase condition. Due to the fault-free messages for the triggering inputs of the first two D flip-flops DF1 and DF2, which are now emitted, the potential of the phase control pulse 101 which is low at this time can be assumed by the latter as "0" information.

If, for example, the fault free message from the switching mechanism SW will not occur, the D flip-flop DF1 cannot take on the potential of the phase control pulse 101 which is provided at its operational input. Since the transfer is thus exclusively effected by the D flip-flop DF2, the signals which are then present on the switched outputs of the first two D flip-flops DF1 and DF2 are equivalent, as opposed to operation without interference. After the equivalent signals have been provided to the second D flip-flops DF3 and DF4, equivalent signals will also be provided at their switched outputs. Due to this fact, the control circuit U will not emit the control pulse 102. Therefore, the flip-flop F1 will remain in a condition whereby the edge control pulse 103 cannot obtain a switching process so that the triggering inputs of the two D flip-flops DF3 and DF4 do not have any further signals applied thereto. Therefore, the timing current supply has reacted in the desired manner to the fact that a fault-free message is missing, whereby only static signals are given on the output lines 2 and 3. The switching mechanism SW, which relies on dynamic signals, is therefore blocked for further information processing. In this manner, dangerous orders or messages are not emitted via the line L5. All faults in the remaining component groups will also cause the timing current supply to switch off and the switching mechanism SW assume a blocked condition.

After the timing current supply has started during the initiation of operation, or after an anti-phase interference, the key T will be actuated. It is preferably designed as an impact free switch so that there is no contact bounce or the like. The reset inputs of the two D flip-flops DF3 and DF4 are connected to "0" potential for a short time, which causes anti-phase signals to appear at their respective outputs. This output state is a precondition for the restarting of the timing current supply, since now the control circuit U will further process the control pulses 103 supplied thereto toward the subsequent devices. In this connection, it may be advantageous to adjust the defined given basic position in the entire switching mechanism SW with the individual linkage and storage members, simultaneously by means of actuating the key T via additional switching means and lines, which are not illustrated in the present drawing.

As briefly explained in the initial part of the specification, the component group ST provides that the timing current supply is not prematurely switched off during short time anti-phase interferences in the switching mechanism SW so that the switching mechanism SW cannot assume a blocked condition. On the other hand, the component group ST guarantees that the timing current supply is switched off when the detected anti-phase interference in the switching mechanism SW exists after a given time. Therefore it becomes possible to differentiate between faulty messages which are caused only on a tentative basis by means of interference energy from actual continuous fault messages during component damage. This is advantageous when the switching mechanism SW is to be operated in an environment which has a high degree of possible interference.

When the component group ST is utilized, the broken line L6 is not present. Then, an AND gate UG1 is connected to the flip-flop F1 via a delay circuit V, and it is connected on its output side with the triggering inputs of the two second D flip-flops DF3 and DF4. The same output of the flip-flop F1 is further connected with the triggering input of a fifth D flip-flop DF5. In addition, an EXCLUSIVE OR gate EO is provided which controls the anti-phase of the rectangular signal voltages and which is connected to the switched outputs of the two first D flip-flops DF1 and DF2 which carry anti-phase signals during an orderly operation. When outputs with equivalent signals are applied, an EXCLUSIVE-NOR gate must be utilized in the place of the EXCLUSIVE OR gate EO.

The component group ST further contains a NAND gate UG2 which advantageously is designed according to a technique whereby an interruption of one of the two input lines causes the output of a logical "1." The NAND gate UG2 is connected at its output side with the conditional input of the fifth D flip-flop DF5 which controls a monostable flip-flop MF1. The basic condition output of the monostable flip-flop MF1 is connected with the AND gate UG1 and the NAND gate UG2. The reset time of the monostable flip-flop MF1 is selected to be shorter than the period duration and longer than half the period duration of the given repetition frequency of the signal voltages. The second input of the NAND gate UG2 is connected with the output of the EXCLUSIVE OR gate EO. The mode of operation of the component group ST is as follows.

Three different faults are to be differentiated for the following observations. On one hand, of concern is anti-phase interference which is detected by the control circuit U. On the other hand, anti-phase interference in the switching mechanism SW is of concern; this type of interference, however, occurs only for a very short time, whereby the interference duration is less than the reset time of the monostable flip-flop MF1. The third anti-phase interference is to also occur in the switching mechanism SW and is of a type which last longer than the reset time, i.e. permanent component damage or the like.

An anti-phase interference detected by the control circuit U causes the timing current supply to be switched off immediately. Thereafter, only static signals will be provided on the lines 2 and 3, and such signals cannot be processed by the switching mechanism SW which requires dynamic signals.

With the second interference case which comprises a short time anti-phase interference in the switching mechanism SW, the pulse for the triggering input of the D flip-flop DF1 will be omitted after a control pulse 102. However, the triggering input of the other D flip-flop DF2 and the left-hand input of the flip-flop F1 will receive an impulse. Therefore, equivalent signals will be provided on the switched outputs of the two first D flip-flops DF1 and DF2. This causes the exclusive OR gate EO of the component group ST to emit a logical "0," instead of a logical "1." This again causes a logical "1" on the output side of the NAND gate UG2 which is transferred to the D flip-flop DF5 along with the next edge control pulse 103. The output side change from a logical "1" to a logical "0" then occurs and causes the monostable flip-flop MF1 to be triggered to its unstable state. In the stable state, the monostable flip-flop MF1 supplies a potential which is effected for controlling the AND gate UG1, so that all pulses emitted by the delay circuit V will reach the triggering inputs of the D flip-flops DF3 and DF4. As long as the monostable flip-flop MF1 is in the unstable state, the aforementioned control potential is eliminated at the corresponding input to the AND gate UG1 so that the pulses required for information transfer at the triggering inputs of the two D flip-flops DF3 and DF4 are eliminated. The equivalent output signals of the first two D flip-flops DF1 and DF2 are therefore not transferred to the D flip-flops DF3 and DF4. The output signals of the flip-flops DF3 and DF4 therefore remain in an anti-phase relationship. The state of the timing current supply which is then reached can be considered to be a rest condition from where a transfer into the operational condition can be effected, but also a transfer into the blocked condition can be effected to place the supply in a switched off condition. The lower input of the NAND gate UG2 obtains a blocking potential in the rest condition, so that the logical "1" remains at the conditional input of the D flip-flop DF4, independent from the output signals of the exclusive OR gate EO.

The transfer into the operational condition is obtained with the second example treated here. The phase control pulse 101 has again the same potential as illustrated at the instant of observation S when the pulse was eliminated at the triggering input of the D flip-flop DF1, until the reset time of the monostable flip-flop MF1 has expired. The value of the reset time can also be increased at an integer multiple. Then, the aforementioned condition is again complied with, namely that the same potential of the phase control pulse 101 is provided at the operational inputs of the first two D flip-flops DF1 and DF2, at the end of the reset time, as was given at the beginning of the mentioned reset time of the monostable flip-flop MF1. If, for example, the reset time is shorter than half the period duration of the prescribed repetition frequency, than the D flip-flop would be in a position whereby the switched outputs of the first D flip-flops DF1 and DF2 would again carry anti-phase signals, at the end of the reset time of the D flip-flop DF2, due to a repeated single control. This signal configuration is correct in itself, but it may not be transferred to the second D flip-flops DF3 and DF4 since it has not been produced by the orderly control of both triggering inputs of the D flip-flops DF1 and DF2.

Since it had been assumed, for this operational example, that only a relatively short anti-phase interference occurs in the switching mechanism SW, the control pulse 102, which has been triggered before the expiration of the reset time and which passes the control circuit 102 and the control members in the switching mechanism SW, will eliminate the anti-phase interference on the switched outputs of the D flip-flops DF1 and DF2, by means of a joint transfer of the potential of the phase control pulse 101 which is present on the respective conditional inputs. If the monostable flip-flop MF1 falls back to the stable condition after the reset time has expired, the AND circuit UG1 is again prepared so that the pulses emitted by the delay circuit V again reach the triggering inputs of the second D flip-flops DF3 and DF4 by way of the AND gate UG1. Therefore, the anti-phase signals offered by the first two D flip-flops DF1 and DF2 are again taken over and extended toward the switching mechanism SW via the lines 2 and 3. The timing current supply is then again in an operational condition.

It has been assumed for the third operational example that the anti-phase interference which occurred in the switching mechanism SW will remain for a period of time longer than the reset time of the monostable flip-flop MF1. In this case, the next edge control pulse 103 provides for the input of the equivalent output signals of the D flip-flops DF1 and DF2 into the D flip-flops DF3 and DF4 after the expiration of the reset time of the monostable flip-flop MF1. Then, their signals will also be equivalent and the control circuit U is blocked for all successive control pulses 102. Therefore, the timing current supply has entered the blocked state from the rest condition. An automatic start is no longer possible, and restarting must be accomplished by actuating the key T.

The devices connected to the output of the control pulse generator 1 can be provided not only once, but several times, since a synchronizing of these devices is provided without difficulty so that several different switching mechanisms can be simultaneously provided with timing current.

Although we have described our invention by reference to a specific illustrative embodiment, many changes and modifications thereof may become apparent to those skilled in the art without departing from the spirit and scope of the invention. We therefore intend to include within the patent warranted hereon all such changes and modifications as may reasonably and properly be included within the scope of our contribution to the art.

What we claim is:

1. A timing current supply for a system of two-channel circuits, which provides binary in-phase and anti-phase variables in the form of two rectangular signal voltages of equal given repetition frequency and amplitude and a phase difference of 180° for differentiating between the two values, control pulses of at least twice the given repetition frequency and positioned outside of the edge ranges of the rectangular pulses of the signal voltages, and control circuits which process the control pulses only during existing an anti-phase relationship of the signal voltages, comprising: a control pulse generator operable to produce a symmetric rectangular voltage as phase control pulses, to produce the control pulses starting at the edges of said phase control pulses, and to produce edge control pulses each positioned between the control pulses; two first D flip-flops each having a trigger input, an output and a conditional input connected to said pulse generator to receive said phase control pulses; two second D flip-flops each having a trigger input, an output, and a conditional input connected to respective ones of said outputs of said two first D flip-flops and which are operable to provide said in-phase and anti-phase signals at their outputs; a control circuit having two inputs connected to respective outputs of said two second D flip-flops, an input connected to said pulse generator to receive said control pulses and an output connected to said trigger input of one of said two first D flip-flops, said control circuit operable to pass said control pulses in response to receipt of anti-phase signals from said second D flip-flops; a switching mechanism having inputs connected to respective ones of said outputs of said two second D flip-flops and to said control circuit and an output connected to said trigger input of the other of said two first D flip-flops, and operable in response to an anti-phase relationship of the signals at its input to supply said control pulses from said control circuit to said other D flip-flops as trigger pulses; a set-reset flip-flop having a first input connected to the output of said control circuit, a second input connected to said pulse generator to receive said edge control pulses and an output connected to said trigger inputs of said second D flip-flops for triggering said second D flip-flops to receive data from the outputs of said first D flip-flops.

2. The timing current supply of claim 1, comprising an AND gate having a first input connected to the output of said set-reset flip-flop, a second input, and an output connected to said trigger inputs of said second D flip-flops; a fifth D flip-flop having a trigger input connected to said output of said set-reset flip-flop, a second input and an output; an EXCLUSIVE-OR gate having two inputs connected to respective outputs of said two first D flip-flops and an output; a NAND gate having a first input connected to said output of said EXCLUSIVE-OR gate, a second input, and an output connected to said second input of said fifth D flip-flop; a monostable flip-flop having an input connected to said output of said fifth D flip-flop and an output connected to said second inputs of said AND and NAND gates, said monostable flip-flop having a reset time longer than half the period duration and shorter than the period duration of said given repetition frequency so that equivalent phase conditions of less than half a period duration do not block said timing current supply.

3. The timing current supply of claim 2, comprising a delay circuit interposed between said AND gate and said set-reset flip-flop.

4. The timing current supply of claim 1, comprising a reset switch connected between said second D flip-flops and a reset potential.

* * * * *